（12）United States Patent
Kossyk et al.

(10) Patent No.: US 11,210,552 B2
(45) Date of Patent: Dec. 28, 2021

(54) SYSTEMS, METHODS, AND COMPUTER READABLE MEDIA FOR PREDICTIVE ANALYTICS AND CHANGE DETECTION FROM REMOTELY SENSED IMAGERY

(71) Applicant: Cape Analytics, Inc., Mountain View, CA (US)

(72) Inventors: Ingo Kossyk, Seefeld-Hechendorf (DE); Suat Gedikli, Planegg (DE)

(73) Assignee: Cape Analytics, Inc., Mountain View, CA (US)

( * ) Notice: Subject to any disclaimer, the term of this patent is extended or adjusted under 35 U.S.C. 154(b) by 0 days.

(21) Appl. No.: 16/682,615

(22) Filed: Nov. 13, 2019

(65) Prior Publication Data

US 2020/0151500 A1    May 14, 2020

Related U.S. Application Data

(60) Provisional application No. 62/767,257, filed on Nov. 14, 2018.

(51) Int. Cl.
*G06K 9/00* (2006.01)
*G06K 9/62* (2006.01)
(Continued)

(52) U.S. Cl.
CPC ....... *G06K 9/6215* (2013.01); *G06K 9/00637* (2013.01); *G06K 9/00657* (2013.01);
(Continued)

(58) Field of Classification Search
CPC ............. G06K 9/6215; G06K 9/6262; G06K 9/00657; G06K 9/00637; G06K 9/627;
(Continued)

(56) References Cited

U.S. PATENT DOCUMENTS

2018/0018553 A1\*  1/2018  Bach .................... G06K 9/4628
2020/0160030 A1   5/2020  Lavi

FOREIGN PATENT DOCUMENTS

JP    2018055287    *   4/2018
JP    2018055287 A    4/2018
(Continued)

OTHER PUBLICATIONS

International Search Report and Written Opinion of the ISA for Application No. PCT/US19/61161 dated Jan. 31, 2020.

*Primary Examiner* — Ping Y Hsieh
(74) *Attorney, Agent, or Firm* — Jeffrey Schox; Diana Lin

(57) ABSTRACT

Systems and methods are provided for automatically detecting a change in a feature. For example, a system includes a memory and a processor configured to analyze a change associated with a feature over a period of time using a plurality of remotely sensed time series images. Upon execution, the system would receive a plurality of remotely sensed time series images, extract a feature from the plurality of remotely sensed time series images, generate at least two time series feature vectors based on the feature, where the at least two time series feature vectors correspond to the feature at two different times, create a neural network model configured to predict a change in the feature at a specified time, and determine, using the neural network model, the change in the feature at a specified time based on a change between the at least two time series feature vectors.

21 Claims, 4 Drawing Sheets

(51) Int. Cl.
  *G06T 7/73*   (2017.01)
  *G06T 7/00*   (2017.01)
  *G06N 3/04*   (2006.01)
  *G06N 3/08*   (2006.01)

(52) U.S. Cl.
  CPC ............ *G06K 9/6262* (2013.01); *G06N 3/04* (2013.01); *G06N 3/08* (2013.01); *G06T 7/74* (2017.01); *G06T 7/97* (2017.01); *G06T 2207/20084* (2013.01)

(58) Field of Classification Search
  CPC ... G06T 7/74; G06T 7/97; G06T 2207/20084; G06T 2207/10032; G06T 2207/10016; G06T 2207/30184; G06T 2207/20081; G06T 2207/20076; G06T 7/00; G06N 3/04; G06N 3/08; G06N 3/0445; G06N 3/0454
  See application file for complete search history.

(56)  References Cited

FOREIGN PATENT DOCUMENTS

WO    2018119035  A1   6/2018
WO    WO2018119035  *   6/2018

* cited by examiner

SYSTEMS, METHODS, AND COMPUTER READABLE MEDIA FOR PREDICTIVE ANALYTICS AND CHANGE DETECTION FROM REMOTELY SENSED IMAGERY

RELATED APPLICATION

This application claims the benefit of U.S. Provisional Application No. 62/767,257, filed Nov. 14, 2018, which is incorporated by reference herein in its entirety. This application is also related to the following application, which is incorporated by reference in its entirety: U.S. patent application Ser. No. 15/253,488, titled "Systems and methods for analyzing remote sensing imagery," which was filed on Aug. 31, 2016.

TECHNICAL FIELD

Embodiments of the present disclosure relate to the field of change detection, predictive analytics, and predictive maintenance from remotely sensed imagery.

BACKGROUND OF THE INVENTION

Real world objects change over time. For example, a roof of a house degrades over time due to natural events, such as rain, wind, and sunlight. As another example, a tree can grow or die over time. Information related to these changes can be useful. For example, an insurance company can assess a risk level for a house depending on the condition of the roof of the house and/or the condition of the surrounding trees. Although these changes can be detected and assessed manually, the manual process is costly, time-consuming, and error-prone.

Therefore, there is a need in the art for improved systems and methods for detecting and analyzing changes in real world objects.

SUMMARY

This invention includes systems and methods that allow automatic detection of changes of an object over time. Non-limiting examples of an object include a house, a driveway, a car, a farmland, a construction site, a neighborhood/community, etc. These changes may occur on the appearance of an object. For example, a displacement of a shingle on a roof. These changes could be dimensional changes such as a growth of a tree over time, or changes in the water level of a body of water.

Disclosed subject matter includes, in one aspect, a system for automatically detecting a change of an object feature over time. The system includes a memory that stores a computational module configured to analyze a change of an object feature over a period of time. The system also includes a processor that is coupled to the memory and configured to execute the stored computational module. Upon execution, the system would detect a change of an object feature over time using a neural network model.

In an exemplary scenario, upon execution, the system would receive a plurality of remotely sensed time series images over a period of time. In some instances, these images may be transmitted from a remote image capturing device such as a satellite camera. Subsequently, the system would extract at least one feature from the plurality of remotely sensed time series images. For example, shingles placement on a roof that is under construction. The system then generates a time series feature vector corresponding to the feature captured in an image at a particular time. To identify a change, the system would generate at least two time series feature vectors among the plurality of remotely sensed time series images. The system then creates a neural network model to predict a change in the feature at a specified time based on the feature vectors. The specified time can be now or at certain time in the future. To determine the change, the system would identify the change (or change pattern) associated with the time series feature vectors and use the change to output a prediction.

Disclosed subject matter includes, in another aspect, a process for detecting a change of a feature through a plurality of remotely sensed time series images. The process includes receiving a plurality of remotely sensed time series image. The process then proceeds to extract a feature from the plurality of remotely sensed time series images. The process then proceeds to generate at least two time series feature vectors associated with the feature extracted from the plurality of remotely sensed time series images at two different time period. The process then proceeds to create a neural network model configured to predict a change (or a change pattern) in the feature at a specific time. The process then proceeds to determine the change of the feature based on the change (or the change pattern) between the time series feature vectors.

Disclosed subject matter includes, in yet another aspect, a non-transitory computer readable medium having executable instructions operable to cause a system to receive a plurality of remotely sensed time series images. The instructions are further operable to cause the system to extract a feature from the plurality of remotely sensed time series images. The instructions are further operable to cause the system to generate at least two time series feature vectors based on the feature. The generated time series feature vectors correspond to the state of the feature at different times. The instructions are further operable to cause the system to create a neural network model configured to predict a change in the feature at a specified time. The instructions are further operable to cause the system to determine, using the neural network model, the change in the feature at a specified time based on a change between the at least two time series feature vectors.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

These and other capabilities of embodiments of the disclosed subject matter will be more fully understood after a review of the following figures, detailed description, and claims.

It is to be understood that both the foregoing general description and the following detailed description are explanatory only and are not restrictive of the claimed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
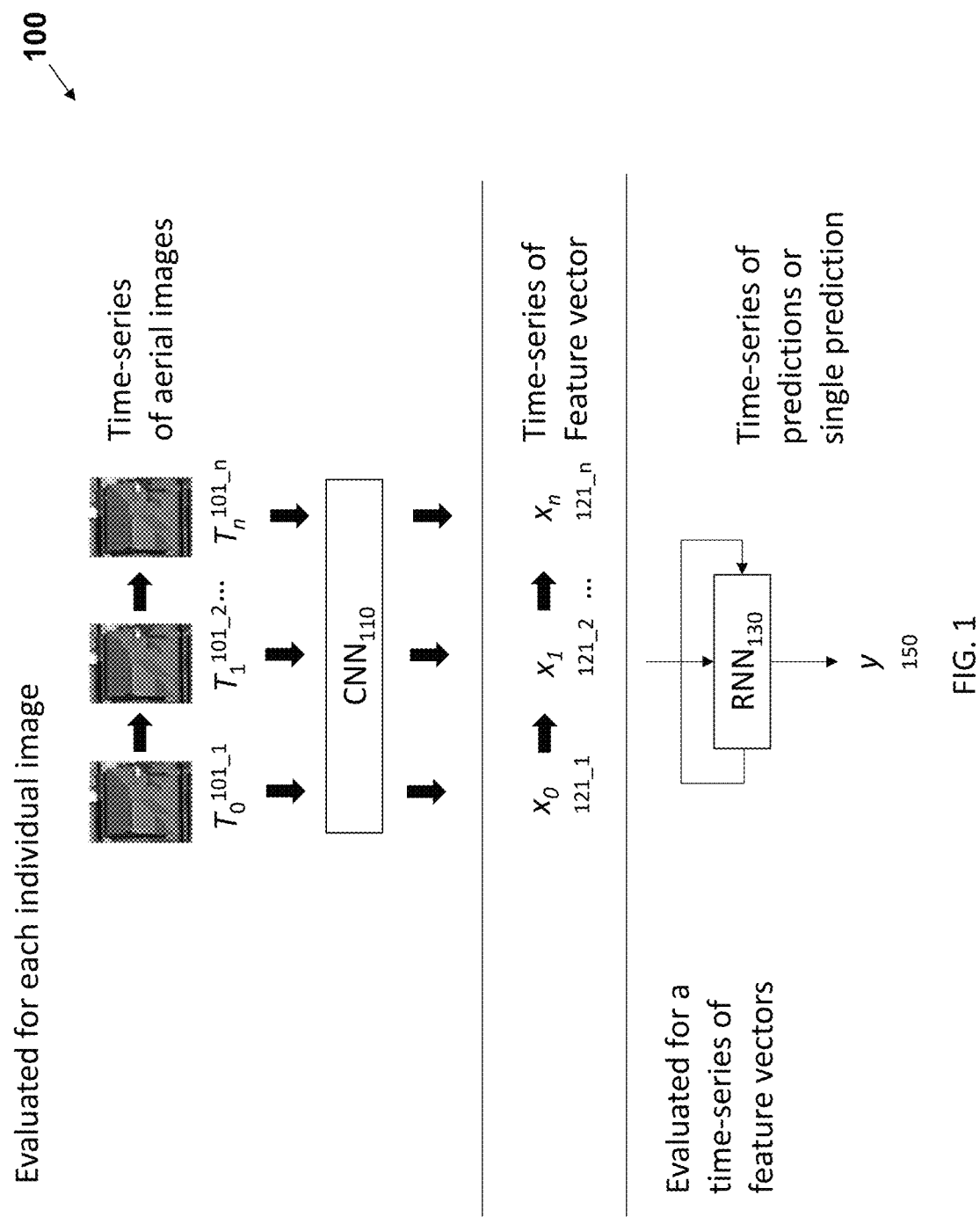
FIG. 1 illustrates a method for detecting and analyzing a change in an object feature through a plurality of remotely sensed time series images in accordance with some embodiments of the present disclosure.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Disclosed systems, methods, and computer readable media can be used to detect changes in time series data, provide predictive analytics based on the detected changes, and perform predictive maintenance using time series data. For instance, the disclosed system can detect progressive material change over time to determine the desirable schedule for maintenance. In some embodiments, predictive maintenance means that a measure for means of preventing total breakdown of an item (for example the roof of a house) can be avoided by sending a craftsman/handyman to fix the gradual damage once the damage (which is over a predefined threshold) was assessed by a method incorporating predictive analytics. Hence the damage can be kept under more control, causes less cost than in the catastrophic case. Further, the chances to send a professional inspector to the site without a serious cause (hence causing unnecessary costs) can be kept at a minimum. In some embodiments, a predictive model means a state (for example a roof condition) that can be extrapolated several steps into the future and thus estimated how it will evolve over time by taking into account the state history. In some embodiments, the time series data can include remotely sensed imagery, which can be acquired by using an image acquisition device (e.g., the image acquisition device described in FIG. 3). The changes that can be detected can include changes in a built environment, vegetation (e.g., changes in landscape), topology (e.g. changes due to natural disasters, such as a landslide, tornado, volcano, earthquake, etc.), and any other suitable changes that can be detected. In some embodiments, the training set of the disclosed system can differentiate important and less important visual changes. For example, the disclosed system can determine that certain features contained within the image are due to seasonal changes while others are due to hazardous events such as a wildfire.

According to some embodiments, deep learning of time series data can be applied to infer a single state and/or a sequence of states of a scene or an object within the time series data. In some embodiments, deep learning of time series data can be applied to perform predictive analysis of the future evolution of such states. In some embodiments, a computer neural network model, such as a deep neural network (DNN), can be used for deep learning. In some embodiments, a scene can include one or more objects (e.g., an artificial object, such as a house, a building, a roof, a pool, a driveway, a shed, or any other type of artificial object, and/or a natural object, such as a tree, a body of water, vegetation, or any other type of natural object). For example, in remotely sensed imagery of property parcels, the images can include a house, a roof (which can be part of the house), a shed, a pool, trees, rocks, and/or any other similar items.

According to some embodiments, images of certain locations can be taken on a regular basis (e.g., every month, every six months, every year, or any other suitable regular interval) and/or on an irregular basis (e.g., images taken as needed). For example, in the case of remotely sensed imagery of property parcels, images of the property parcels can be taken on the first day of each month. These images can be used to create deep learning models, such as neural network models, to provide systems, methods, and computer readable media for change detection, predictive analytics, and predictive maintenance.

According to some embodiments, the use of deep learning can be categorized into at least three types: many-to-one inference; many-to-many inference; and many-to-many prediction. In the many-to-one inference type, the current state can be inferred from a sequence of time steps taken up until the present time. For example, given remotely sensed images of a house over the course of twelve months, where one image was acquired each month, one can infer on the current condition of the roof by presenting the sequence of images to the DNN. In the many-to-many inference type, the state at each time step up until the present time can be inferred. For example, given remotely sensed images of a house over the course of twelve months, where one image was acquired each month, one can infer on the condition of the roof of the house in each month. In the many-to-many prediction type, the evolution of a state or multiple states in the future can be predicted. For example, given remotely sensed images of a house over the course of twelve months, where one image was acquired each month, one can predict the state or states in the future months to come with increasing uncertainty. In some embodiment, the uncertainty is based on a confidence interval associated with one or more sampled instances. For example, in the case of roof condition, the confidence interval associated with a near term prediction using recently obtained images may be higher than the confidence interval associated with a distant future prediction using recently obtained images. In some embodiments, a recurrent neural network (RNN) model can receive, as an input, the sequence of images up until the present time. The model can then run without input from one or several time steps in order to generate a prediction for one or multiple time steps. For example, if a time series spans over 6 months, at the fourth month the prediction model can run without inputs from the first and second month.

According to some embodiments, instead of estimating a single time instance target prediction (following a many-to-one paradigm), an RNN model can be used for sequence-to-sequence (many-to-many) mapping. In these embodiments, the RNN can predict the development and/or behavior of an estimated target value over time. This can be achieved either by applying the RNN to a running window or to an indefinitely long sequence. When applying the RNN to the running window, in some embodiments, the RNN resets after a predefined amount of samples have been obtained. In some embodiments, RNN can also be trained on a stream of data (which, in some embodiments, can be infinitely in length) by not resetting after a predefined amount of samples.

According to some embodiments, predictive analytics refer to a machine learning domain in which models trained on time series of data can be used to predict the future behavior of a real-world system. In some embodiments, a time series can be generated using a convolutional neural network (CNN) in the context of remotely sensed imagery. The CNN can serve as a feature extractor. For example, a CNN can be applied to a time series of successive remotely sensed images of a physical location (e.g., a house or a property parcel) to extract a feature from the physical location and generate a feature vector corresponding to the feature. For example, the CNN can extract the roof as a feature from each of the successive remotely sensed images of a house. In some embodiments, the resulting feature vectors and the corresponding time steps can be used to train an RNN. The RNN can be used to handle dynamic temporal behavior, where the target value for training can be taken from several steps into the future of the time series. For example, the RNN can receive time-series of feature vectors extracted from the image of the roof of a house over a period of time. Based on this time-series of feature vectors, the state of the roof at a particular time (e.g., past or present) can be inferred and/or the state of the roof in the future can be predicted. In some embodiments, the state of the roof can be assigned a score (e.g., a scale of 1 to 5, where 1 represents the state being very bad and 5 represents the state being excellent). For example, for a time-series $[t_0, t_1, t_2, t_3, t_4, t_5, t_6, t_7, t_8]$ (where the time $t_0$ to $t_8$ represent regular intervals at which the images were taken in the past), the feature vectors could correspond to scores [5, 5, 4, 1, 5, 5, 4, 4, 3]. In some embodiments, each time stamp is associated with a score. In some embodiments, each time stamp is associated with other suitable indicators, classes, and/or distributions. Based on these scores, the state of the roof of the house can be inferred for each of the time instances in the time-series. It can also be inferred that at time $t_4$, the roof likely experienced a sudden damage possibly due to a disaster (e.g., a fire or a falling tree) and that at time $t_5$, a new roof likely had been installed. Moreover, the state of the roof at the present (which is time $t_8$ in this example) can be predicted to be 3 based on the trend. The future state(s) of the roof can be predicted similarly.

According to some embodiments, the resulting estimation or prediction can be interpreted as the probability of a certain state occurring N steps in the future. In some embodiments, the CNN and the RNN can be trained disjointly in two successive steps. In some embodiments, weights of CNN models that have been pre-trained on a certain problem domain can be used. For example, weights of CNN models that have been pre-trained on remotely sensed imagery of house roofs can be used. The weights are the parameter that models the connection between the neurons of the CNN. In some embodiments, the RNN can be built using one to several successive layers. In some instances, a deep RNN can span over several recurrent layers in sequence.

FIG. 1 illustrates a method 100 for detecting and analyzing a change in a feature in remotely sensed time series images according to certain embodiments. In some embodiments, the method utilizes a DNN model for predictive analytics. In some embodiments, the DNN model can include two parts: a CNN 110 and an RNN 130. In some embodiments, the CNN 110 is trained independently from the RNN 130.

According to certain embodiments, the CNN contains a Deep Learning algorithm which can take in an image, assign importance (learnable weights and biases) to various aspects/objects in the image and be able to differentiate one form the other. The CNN is trained to learn the parameters and transformation values associated with an image. In an iterative process, CNN can be trained to identify and map spatial parameters to the space of parcel boundaries, and thus identify the parcel. A training example for the CNN is disclosed in U.S. patent application Ser. No. 15/253,488, which is incorporated by reference in its entirety.

According to some embodiments, the RNN includes multiple copies of the same network, each passing a message to a successor. Like the CNN, the RNN can accept an input vector x, and gives an output vector y. However, unlike a CNN, the output vector's contents are influenced not only by the input provided by the user, but also by the entire history of inputs that the user has provided in the past. According to some embodiments, the RNN has an internal state that gets updated every time a new input is received.

According to some embodiments, the CNN 110 serves as a feature extractor. The CNN 110 can receive a set of time series images 101_1, 101_2, . . . , 101_n that respectively correspond to the time series $[t_0, t_1, \ldots, t_n]$ (where n can be equal to or greater than 1, and when n is equal to 1, the time series set would include only two elements: $t_0$ and $t_1$). In some embodiments, the time series images 101_1, 101_2, . . . , 101_n can be remotely sensed images (e.g., aerial images).

According to some embodiments, for each of the time-series images 101_1, 101_2, . . . , 101_n, the CNN 110 can extract a feature vector x, resulting in a time series of feature vectors $x_0$ 121_1, $x_1$ 121_2, . . . , $x_n$ 121_n, which respectively correspond to the time-series images 101_1, 101_2, . . . , 101_n. In some embodiments, the CNN can identify an object based on the object's primitive features such as edges, shapes, and/or any combination thereof. For example, the CNN may recognize a house's roof based on features such as the roof's edges and shapes.

According to some embodiments, the RNN 130 can receive the time series of feature vectors $x_0$ 121_1, $x_1$ 121_2, . . . , $x_n$ 121_n as inputs from CNN 110. In some embodiments, the RNN 130 can make inference on a single prediction y 150 and/or a time-series of predictions $[y_0 \ldots y_k]$ (not shown in the figure) (where k can be equal to or greater than 1) that can depend on the problem domain.

Figure 2:
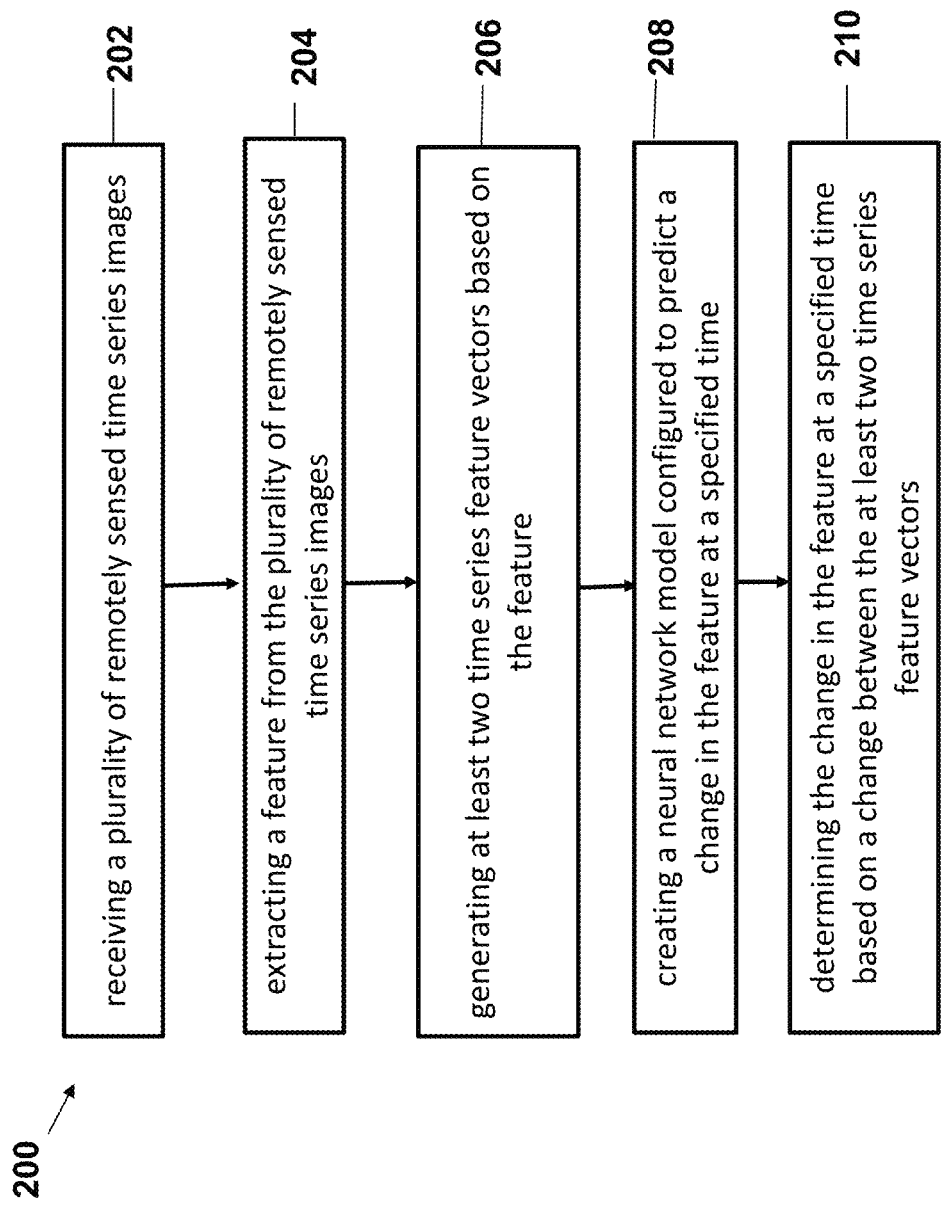
FIG. 2 illustrates a process for determining a change in a feature at a specified time in accordance with some embodiments of the present disclosure.

FIG. 2 illustrates a process for determining a change in a feature at a specified time in accordance with some embodiments of the present disclosure. In some embodiments, the process 200 can be modified by, for example, having steps combined, divided, rearranged, changed, added, and/or removed.

According to some embodiments, at step 202, a server receives a plurality of remotely sensed time series images. In some embodiments, the plurality of remotely sensed time series images are captured at regular intervals. In some embodiments, the plurality of remotely sensed time series images are captured at irregular intervals. The process 200 then proceeds to step 204.

At step 204, the server extracts one or more features from the plurality of remotely sensed time series images received at step 202. In some embodiments, the feature can be extracted by a CNN. The feature can be a permanent feature, a temporary feature, or a changing feature. For example, in a roofing context, the permanent feature is a roof's shingles; the temporary feature is observable changes due to sun light or weather; and the changing feature is shingle conditions, missing shingles, streaks, and/or spots. In some embodiments, the feature is at least one of a property condition, a neighborhood condition, a built environment, a vegetation state, a topology, a roof, a building, a tree, or a body of water. In some embodiments, the feature is defined by an aggregated state derived from the sub-states of partial features (or sub-components). For example, the feature can be an overall neighborhood state, which can be an aggregate state of a plurality of sub-states corresponding to sub-components (e.g., the houses within the neighborhood, the roads within the neighborhood, the bodies of water within the neighborhood, and any other sub-features that can part of the neighborhood). The process 200 then proceeds to step 206.

At step 206, the server generates one or more time series feature vectors based on the feature, each of which corresponds to the feature from the each of the plurality of time series images extracted at step 204. In some embodiments, the plurality of time series feature vectors can be generated by the CNN. In some embodiments, the server further determines a plurality of time series scores, each of which corresponds to the feature from the each of the plurality of time series images. The process 200 then proceeds to step 208.

At step 208, the server creates a neural network model configured to predict a change in the feature based on the plurality of time series feature vectors generated in step 206 In some embodiments, insignificant changes can be discarded when the neural network model is created. Insignificant changes may include changes that are not important to the state of the feature. For example, a shadow on a roof is not significant to the state of the roof. The neural network model can be trained to identify these insignificant changes. For example, the training dataset can contain two images of a roof, one with shadow and one without shadow. The system then applies the same ground-truth mapping value is to both images irrespective of the shadow effect, hence, forcing the neural network to become invariant to shadows when trained with this data. In some embodiments, the neural network model can be composed of a neural network that is at least one of an RNN or a CNN. The process 200 then proceeds to step 210.

At step 210, the server determines, using the neural network model, a change in the feature at a specified time based on a change between/among the time series feature vectors. In some embodiments, the specified time is the present. In some embodiments, the specified time is in the future. In some embodiments, the change in the feature can be predicted based on a plurality of time series scores.

Figure 3:
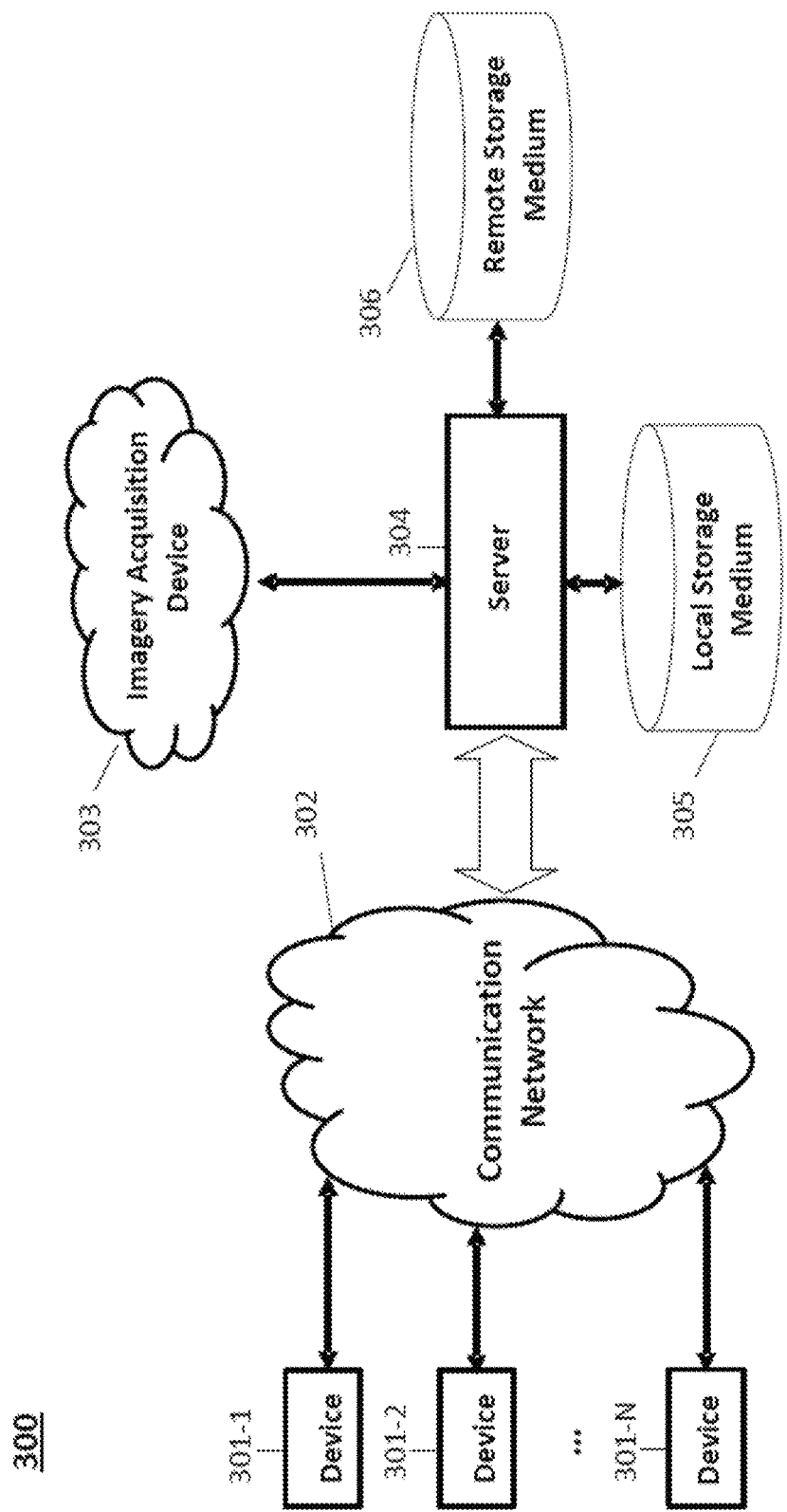
FIG. 3 illustrates a system for detecting and analyzing a change in an object feature through a plurality of remotely sensed time series images in accordance with some embodiments of the present disclosure.

FIG. 3 illustrates a system 300 for detecting and analyzing a change in a feature in remotely sensed time series images. The system 300 can include a server 304, at least one client device 301 (e.g., client devices 301-1, 301-2, . . . , 301-N), an imagery acquisition device 303, a local storage medium 305, and a remote storage medium 306. All components in the system 300 can be coupled directly or indirectly to a communication network 302. The components described in the system 300 can be further broken down into more than one component and/or combined together in any suitable arrangement. Further, one or more components can be rearranged, changed, added, and/or removed. For example, in some embodiments, the system 300 can obtain the data from third-party vendors. In other embodiments, the system 300 can directly acquire data through the imagery acquisition device 303.

Each client device 301 can communicate with the server 304 to send data to, and receive data from, the imagery analysis server 304 via the communication network 302. Each client device 301 can be directly or indirectly coupled to the server 304. Additionally, each client device 301 can be connected to the server 304 via any other suitable device(s), communication network, or a combination thereof. A client device 301 can include, for example, a desktop computer, a mobile computer, a tablet computer, a cellular device, a smartphone, a television, or any computing system that is capable of performing the computation processes described above.

The server 304 is configured to receive imagery data from the imagery acquisition device 303. The imagery analysis server 304 can extract, analyze, and/or label structural and/or geospatial information of the received imagery data based on the techniques disclosed in this present disclosure. In some embodiments, a classifier can be trained and/or maintained in the server 304. The server 304 is shown as a single server; however, the server 304 can include more than one server. For example, in some embodiments, the server 304 can include multiple modular and scalable servers and/or other suitable computing resources. The server 304 can support elastic computing, which can dynamically adapt computing resources based on demand. The server 304 can be deployed locally and/or remotely in a third-party cloud-based computing environment. In some embodiments, within the server 304 or any other suitable component of system 300, a device or a tool—including those described in the present disclosure—can be implemented as software and/or hardware.

The imagery acquisition device 303 is configured to provide the server 304 with imagery data. In some embodiments, the imagery acquisition device 303 can acquire satellite imagery, aerial imagery, radar, sonar, LIDAR, seismography, or any other suitable mode or combination of modes of sensory information. In some embodiments, the system 300 does not include the imagery acquisition device 303 and can obtain imagery data from third-party vendors. In some embodiments, the imagery acquisition device can be part of a GIS. The system 300 includes two storage media: the local storage medium 305 and the remote storage medium 306.

The local storage medium 305 can be located in the same physical location as the server 304, and the remote storage medium 306 can be located at a remote location or any other suitable location or combination of locations. In some embodiments, the system 300 includes more than one local storage medium, more than one remote storage medium, and/or any suitable combination thereof. In some embodiments, the system 300 may only include the local storage medium 305 or only include the remote storage medium 306.

The system 300 can also include one or more relational databases, which include scalable read replicas to support dynamic usage. The one or more relational databases can be located in the local storage medium 305, the remote storage medium 306, the server 304, and/or any other suitable components, combinations of components, or locations of the system 300.

The communication network 302 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and/or network protocols. In some embodiments, the communication network 302 can be an encrypted network. While the system 300 shows the communication network 302 as a single network, the communication network 302 can also include multiple interconnected networks described above.

Figure 4:
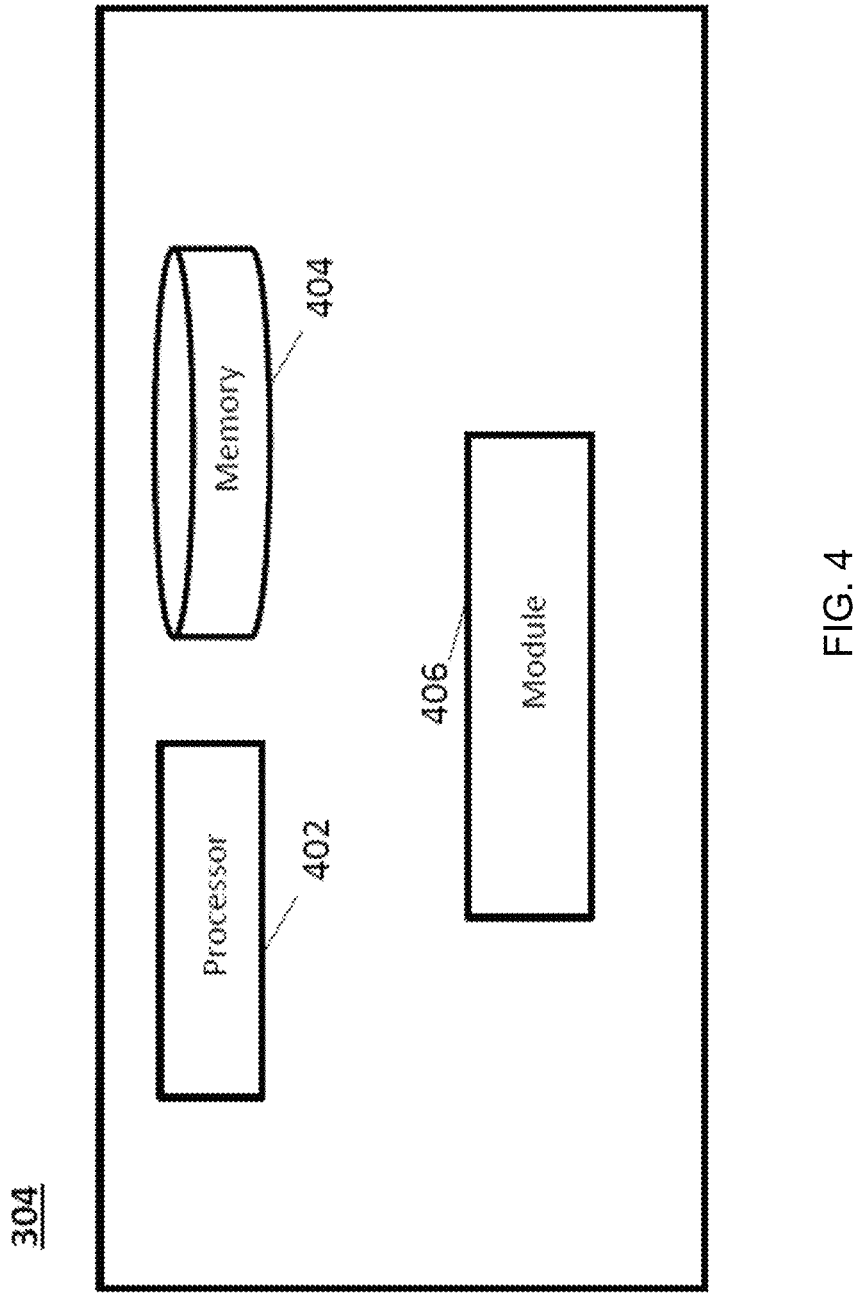
FIG. 4 illustrates a block diagram of a server in accordance with some embodiments of the present disclosure.

FIG. 4 illustrates a block diagram of the server 304 in accordance with some embodiments of the present disclosure. The server 304 includes a processor 402, a memory 404, and a module 406. The server 304 may include additional modules, fewer modules, or any other suitable combination of modules that perform any suitable operation or combination of operations.

The processor 402 is configured to implement the functionality described herein using computer executable instructions stored in temporary and/or permanent non-transitory memory. The processor can be a general purpose processor and/or can also be implemented using an application specific integrated circuit (ASIC), programmable logic array (PLA), field programmable gate array (FPGA), and/or any other integrated circuit.

The processor 402 can execute an operating system that can be any suitable operating system (OS), including a typical operating system such as Windows, Windows XP, Windows 7, Windows 8, Windows Mobile, Windows Phone, Windows RT, Mac OS X, Linux, VXWorks, Android, Blackberry OS, iOS, Symbian, or other OS.

The module 406 and/or other modules in the server 304 can be configured to cause the processor 402 or the server 304 to perform various functions described herein. These functions can include the functions related to the CNN 110 and RNN 130, as described in connection with FIG. 1 above. In some embodiments, within the module 406 or any other suitable component of the server 304, a device or a tool can be implemented as software and/or hardware.

In some embodiments, the module 406 can be implemented in software using the memory 404. The memory 404 can be a non-transitory computer readable medium, flash memory, a magnetic disk drive, an optical drive, a programmable read-only memory (PROM), a read-only memory (ROM), or any other memory or combination of memories.

It is contemplated that systems, devices, methods, and processes of the disclosure invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the disclosure remains operable. Moreover, two or more steps or actions may be conducted simultaneously. The mention herein of any publication, for example, in the Background section, is not an admission that the publication serves as prior art with respect to any of the claims presented herein. The Background section is presented for purposes of clarity and is not meant as a description of prior art with respect to any claim.

It is to be understood that the disclosed subject matter is not limited in its application to the details of construction and to the arrangements of the components set forth above or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter.

What is claimed is:

1. A method of detecting a change in a feature in remotely sensed time series images, the method comprising:
   receiving, at a server, a plurality of remotely sensed time series images;
   extracting, at the server, a feature from the plurality of remotely sensed time series images;
   generating, at the server, at least two time series feature vectors based on the feature, wherein the at least two time series feature vectors correspond to the feature at two different times;
   creating, at the server, a neural network model configured to predict a change in the feature at a specified time; and
   determining, at the server using the neural network model, the change in the feature at the specified time based on a change between the at least two time series feature vectors, wherein the neural network model receives as input the at least two time series feature vectors.

2. The method of claim 1, wherein the feature is extracted by a convolutional neural network, and wherein the at least two time series feature vectors are generated by the convolutional neural network.

3. The method of claim 1, wherein the neural network model is based on a neural network that comprises at least one of a recurrent neural network or a convolutional neural network.

4. The method of claim 1, wherein the plurality of remotely sensed time series images are captured at regular intervals.

5. The method of claim 1, wherein the plurality of remotely sensed time series images are captured at non-regular intervals.

6. The method of claim 1, wherein the feature is at least one of a property condition, a neighborhood condition, a built environment, a vegetation state, a topology, a roof, a building, a tree, or a body of water.

7. The method of claim 1, wherein the feature is defined by an aggregated state based on one or more sub-states of one or more partial features.

8. The method of claim 1 further comprising determining, at the server, a plurality of time series scores, each of which corresponds to the feature.

9. The method of claim 8, wherein the change in the feature is determined based on the plurality of time series scores.

10. The method of claim 8, wherein an insignificant change in the feature is discarded.

11. A server for detecting a change in a feature in remotely sensed time series images, the server comprising:
 a memory that stores a module; and
 a processor configured to run the module stored in the memory that is configured to cause the processor to:
  receive a plurality of remotely sensed time series images;
  extract a feature from the plurality of remotely sensed time series images;
  generate at least two time series feature vectors based on the feature, wherein the at least two time series feature vectors correspond to the feature at two different times;
  create a neural network model configured to predict a change in the feature at a specified time; and
  determine, using the neural network model, the change in the feature at the specified time based on a change between the at least two time series feature vectors, wherein the neural network model receives as input the at least two time series feature vectors.

12. The server of claim 11, wherein the feature is extracted by a convolutional neural network, and wherein the at least two time series feature vectors are generated by the convolutional neural network.

13. The server of claim 11, wherein the neural network model is based on a neural network that comprises at least one of a recurrent neural network or a convolutional neural network.

14. The server of claim 11, wherein the plurality of remotely sensed time series images is captured at regular intervals.

15. The server of claim 11, wherein the plurality of remotely sensed time series images is captured at non-regular intervals.

16. The server of claim 11, wherein the feature is at least one of a property condition, a neighborhood condition, a built environment, a vegetation state, a topology, a roof, a building, a tree, or a body of water.

17. The server of claim 11, wherein the feature is defined by an aggregated state based on one or more sub-states one or more partial features.

18. The server of claim 11, wherein the module stored in the memory is further configured to cause the processor to determine a plurality of time series scores, each of which corresponds to the feature.

19. The server of claim 18, wherein the change in the feature is determined based on the plurality of time series scores.

20. The server of claim 18, wherein an insignificant change is discarded.

21. A non-transitory computer readable medium storing executable instructions operable for detecting a change in a feature in remotely sensed time series images to cause a processor to perform operations comprising:
 receiving a plurality of remotely sensed time series images;
 extracting a feature from the plurality of remotely sensed time series images;
 generating at least two time series feature vectors based on the feature, wherein the at least two time series feature vectors correspond to the feature at two different times;
 creating a neural network model configured to predict a change in the feature at a specified time; and
 determining, using the neural network model, the change in the feature at a specified time based on a change between the at least two time series feature vectors, wherein the neural network model receives as input the at least two time series feature vectors.

* * * * *